Dec. 9, 1969   J. E. McCORMICK   3,482,908
TECHNIQUE FOR PRODUCING 3-D MOTION PICTURES
Filed May 15, 1967   2 Sheets-Sheet 1

INVENTOR.
JOHN E. McCORMICK
BY Harry A. Herbert Jr
ATTORNEY

Arthur R. Parker
AGENT

Dec. 9, 1969  J. E. McCORMICK  3,482,908

TECHNIQUE FOR PRODUCING 3-D MOTION PICTURES

Filed May 15, 1967  2 Sheets-Sheet 2

INVENTOR.
JOHN E. McCORMICK
BY Harry A. Herbert Jr.
ATTORNEY
Arthur R. Parker
AGENT United States Patent Office 3,482,908
Patented Dec. 9, 1969

3,482,908
TECHNIQUE FOR PRODUCING 3-D
MOTION PICTURES
John E. McCormick, 404 Expense St.,
Rome, N.Y. 13440
Filed May 15, 1967, Ser. No. 639,935
Int. Cl. G08b 19/18, 21/32
U.S. Cl. 352—38                                    5 Claims

ABSTRACT OF THE DISCLOSURE

A stereo device is attached to a motion picture camera adjacent to the objective lens for dividing the image of an observed object into almost identical right and left-eye views, respectively. A shield is positioned within the camera in front of the film plane to alternately expose only one half of each frame of film to the respective right and left-eye views being received at the camera objective lens. The film strip formed in the above manner is then processed, divided into separate right and left-eye view strips, and then joined together in overlapping manner and printed as a single, composite film strip to form three dimensional pictures when projected on a standard screen.

BACKGROUND OF THE INVENTION

This invention relates generally to the field of three dimensional motion picture producing cameras and, in particular, to the use of a standard type motion picture camera adapted to produce motion pictures for projection on a standard screen and viewed in three dimensional form with the unaided eye.

In the development of apparatus and/or methods for forming and projecting stereoscopic images, previous solutions have included the use of rotary shutters, normally positioned adjacent the camera objective, which are designed to assure the simultaneous presentation to the viewer of alternate right and left-eye views of the observed object in a continuous film strip to give a three dimensional effect based on the binocular vision and the persistence of human sight. Other developments for this purpose have utilized either separate lens systems, or a combined lens system for alternately producing and/or projecting first the respective right-eye images, and then the left-eye images. In still other cameras and/or projection systems developed to produce the three dimensional effect, special glasses to be worn by the viewer, or specially designed lenticular screens are required. The disadvantages inherent in the use of such special glasses are obvious. As an example of the extreme difficulties involved in the use of lenticular screens, one such arrangement involved a lenticular screen specially designed for reciprocatory movement. The later movement had to be in absolute synchronism with the rotation of a shutter which resulted in the alternate transmission of right and left-hand views. Still other 3-D systems involve the use of an optical system including an arrangement of mirrors mounted at approximately 45° angle to each other for the purpose of reflecting two separate beams of light representing left and right-hand images of the object being observed. In addition, the processing of film has previously included the joining together into a single film strip of two separate film strips exposed to images representing the left and right-hand views, respectively, of the observed object. However, in these previously taught arrangements, since the combined film strip is normally twice the length of the original film strips, the problem of synchronizing the sound track with the film track becomes further complicated. In this regard, the system of the present invention involves a unique and improved three-dimensional motion picture producing apparatus and method eliminating many of the problems inherent in the above noted, previously developed three-dimensional systems in an obvious manner to be explained in more detail hereinafter.

SUMMARY OF THE INVENTION

The principal object of the present invention resides, therefore, in the development of a simplified 3-D motion picture camera having novel means for producing improved three-dimensional film for projection on a standard screen without requiring the use of polarized glasses.

A further object of the invention is in the utilization of an improved motion picture camera adapted for use with a standard stereo lens system attachment for producing left and right-eye images respectively on a single film strip.

A still further object of the invention is in the use of a standard type 3-D motion picture camera slightly modified to the ensure arrangement of the left and right-eye views formed thereby on alternate, exposed half portions of each frame of film.

Another object of the invention involves an improved processing and assembling technique for printing the three-dimensional film produced by the improved 3-D motion picture camera of the present invention.

Other objects and advantages of the invention will become apparent from the following description taken in connection with the accompanying drawings, in which:

DESCRIPTION OF THE PREFERRED
EMBODIMENT

Figure 1:
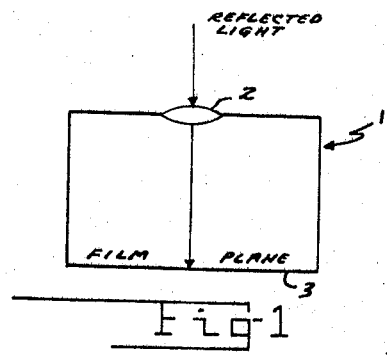
FIGURES 1 and 1a, respectively, represent diagrammatic views of the standard non-stereoscopic type camera used with the present invention, and the standard type film strip formed thereby.
Figure 1A:
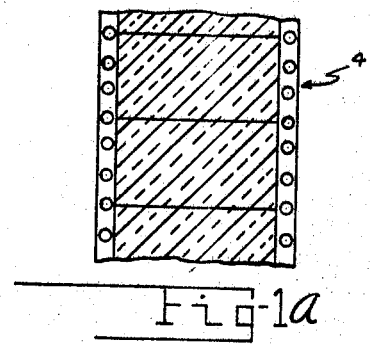

Referring to the drawings and in particular to FIGURES 1 and 1a, a standard single lens type basic camera is indicated generally at 1 in schematic form as incorporating the objective lens 2 and the film plane at 3. Reflected light from the subject is shown focused by the lens 2 to form the usual non-stereoscopic images on the film plane 3. The usual film strip of the non-stereoscopic type images formed by the standard type camera is depicted at 4 in FIGURE 1a.

Figure 2:
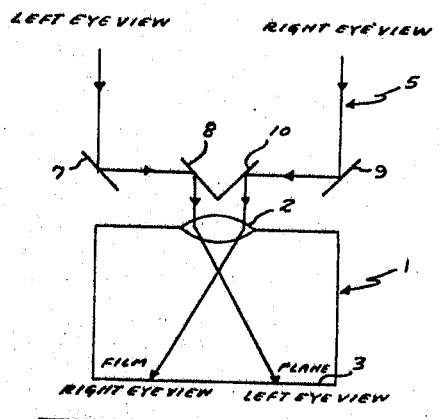
FIGURES 2 and 2a, respectively, illustrate further diagrammatic views of the camera of FIGURE 1 modified by the attachment thereto of a standard stereoscopic device, and the effect of the use of such an attachment device on the film strip formed thereby.
Figure 2A:
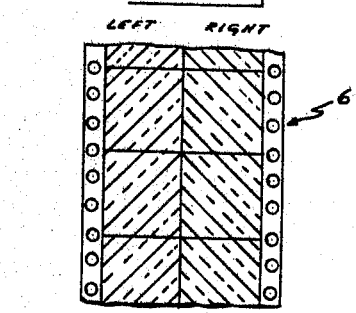

By comparison, in FIGURE 2, camera 1 has been equipped with a stereo attachment of the type illustrated schematically and generally at 5 to form the stereoscopic type images shown by the film strip 6 in FIGURE 2a. Stereo attachment 5 constitutes a beam-splitter device consisting of an arrangement of four mirrors dividing reflected light from the subject into right-eye and left-eye views as shown. Thus, the beam of light representing the left-eye views is reflected by the left hand mirror group indicated at 7 and 8, and the beam of light representing the right-eye views is reflected by the right hand mirror group indicated at 9 and 10 to the camera objective 2. The mirrors 7 to 9, inclusive, may be mounted at approximately 45° angles to each other and to the optical axis to direct the previously noted right and left-eye images downwardly through the objective 2 as shown to thereby be simultaneously focused on the film plane 3 as two separate and almost identical images arranged in side-by-side relation as shown in FIGURE 2 and as further depicted by the film strip 6 in FIGURE 2a. The use of the standard type stereo device 5 with mirrors instead of lenses effects an arrangement having no effect on the image size and, because two images have now been formed, the horizontal field is halved; however, the vertical field is not affected.

Figure 3:
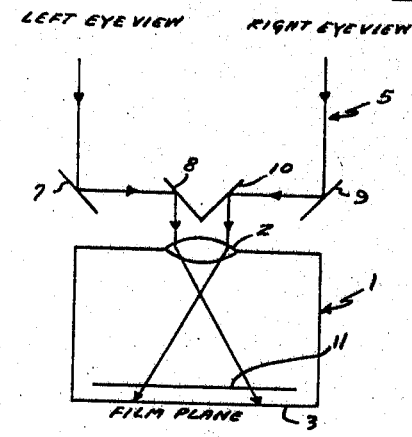
FIGURES 3 and 3a, respectively, represent still further diagrammatic views of the camera of FIGURE 2 further modified by the use of a shield device forward of the film plane, and the effect thereof on the film strip formed thereby.
Figure 3A:
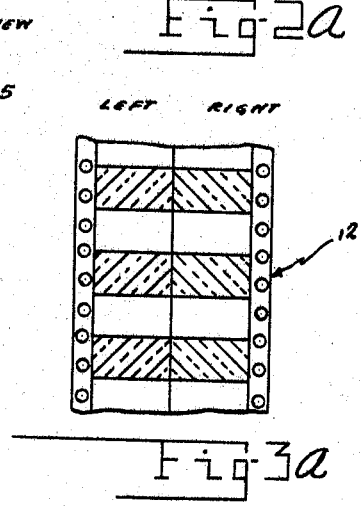

Referring particularly to FIGURES 3 and 3a of the drawings, the improved camera of the present invention is again shown generally at 1 as similar to that of the previously described camera for FIGURES 1 and 2, but with the camera now further modified by positioning a shield device, indicated schematically at 11, slightly in front of the film plane 3 and arranged to allow only one half of each frame of film to be exposed to the respective right-eye and left-eye views of the subject. The aforesaid shield device 11 may be positioned to mask either the upper or lower half of the frame as desired. Although the preferred embodiment of the present invention is illustrated as utilizing a camera with a single objective lens as at 2, it is equally clear that other lens systems may be employed with the shield device 11 without departing from the true spirit or scope of the invention. With the use of the device, the film strip formed thereby is clearly improved over other arrangements, as will become readily apparent from the following description. First, two images representing right and left-eye views are formed only on alternately exposed halves of each frame of film. Then, the alternate other halves of each film frame remain unexposed as shown generally at 12 in FIGURE 3a. With alternate halves of each film frame being blocked off by the use of the inventive shield device 11, the horizontal field thus exposed is one half of the original field available, and the images formed on the exposed halves cover only one fourth of the subject covered by each film frame with the camera form of FIGURE 1 for example. Thus, to cover the same field of view, the objective lens of the improved camera of FIGURE 3 should have a focal length approximately one half that of FIGURE 1.

Figure 4A:
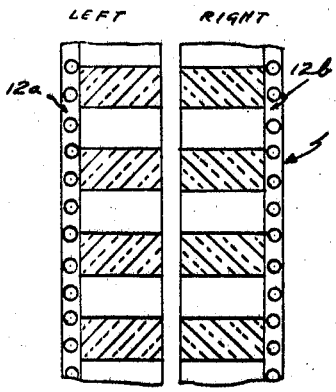
FIGURES 4a, 4b and 4c, respectively, depict the film strip dividing, shifting and overlapping steps involved in the improved method of the present invention to print stereoscopic film.
Figure 4B:
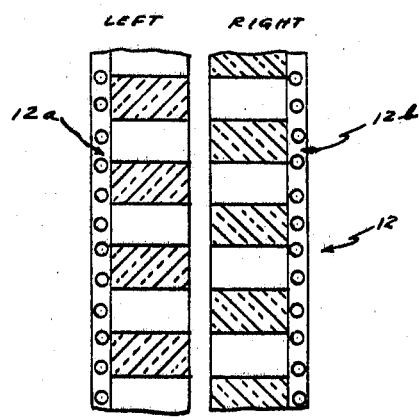
Figure 4C:
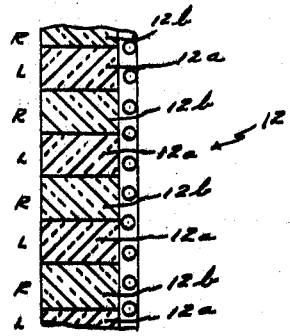

By the addition of the shield device 11 to thereby form the improved camera optical system of FIGURE 3, an improved method of processing and printing three-dimensional type pictures is also facilitated, as will be described hereinafter in detail with specific reference to FIGURES 4a, 4b and 4c of the drawings. Thus, after taking motion pictures of the subject and thereby completing the exposure of a roll of film in the manner previously described above, the film strip indicated generally at 12 in FIGURE 3a is removed from the camera and processed in the normal manner. The unexposed frames, of course, remain clear. Film strip 12 is then split into two half portions representing the left-eye view and right-eye view frame portions indicated at 12a and 12b, respectively. Next, the two halves of film thus formed are vertically shifted one half of a frame, as shown in the step depicted in FIGURE 4b, so that alternate exposed frame portions of each film strip 12a, 12b are directly opposite and in alignment with alternate unexposed frame portions thereof. Finally, the two halves of film are then overlapped, as indicated in the step of FIGURE 4c, with the left and right-eye views, 12a and 12b, respectively, alternately disposed in a single continuous and composite type film strip equal in overall length to the initially formed separate left and right-eye view images. This sandwich of the two film halves may then be printed by normal printing techniques and projected by a standard type projector and viewed in three-dimensional manner on a standard projection screen without the need of special polarized glasses.

With the improved method of producing film prints resulting from the addition of the shield device 11 to the camera 1 of FIGURE 3, film taken with a 16, 35 or 70 mm. camera may be printed on 8, 16 and 35 mm. film respectively. Furthermore, if, for example, the camera used is a 16 mm. type, the film print resulting from the improved technique or film-printing process of the present invention would be on an 8 mm. film. In this event, an 8 mm. projector, running at twice its normal speed, would be utilized to project the film images onto a standard screen. Since the normal speed for such projectors is 16 to 24 frames per second, the projection of the alternate left and right images produced by the camera 1 of the present invention at a rate of from 32 to 48 images or frames per second will produce a three-dimensional effect on the viewer without any requirement for the use of polarized glasses. Since each subsequent left and right image on the film shows identical, or almost identical action, the projected 3-D image will appear normal even though film is advancing at twice normal speeds.

I claim:

1. An improved method of facilitating the production of stereoscopic film prints adapted to be projected on a standard screen and viewed without special glasses, comprising, the steps of preparing a film strip by initially dividing light reflected from the subject being photographed into two separate beams respectively representing images of right and left-eye views thereof, focusing the divided beams in justaposed side-by-side relation on each frame of the film strip, exposing alternate half portions only of each frame of film to the twin images produced by the divided beams, and processing and printing the respective series of twin images thus formed in juxtaposed relation on each half frame of film into a single composite film strip of continuous right and left-eye views for display of stereoscopic motion pictures on a standard projection screen by a standard projector.

2. An improved method of facilitating the production of stereoscopic film prints as in claim 1, wherein said processing and printing includes the step of arranging each respective series of right and left-eye view images in alternate vertical alignment with each other without increasing the original size of the film strip.

3. An improved method of facilitating the production of stereoscopic film prints as in claim 1, wherein said processing and printing includes the steps of initially dividing the twin images formed by the respective right and left-eye views into separate film strips, eliminating the unexposed film frame portions, and rearranging the separate strips into a composite film strip printed with continuous, alternately-disposed right and left-eye view images displayed thereon.

4. An improved method of facilitating the production of stereoscopic prints as in claim 1, wherein said processing and printing includes the steps of splitting the exposed film strip into two separate film strip portions representing a plurality of right and left-eye views of the subject, and aligning the alternate right-eye view exposed frame portions with the corresponding left-eye view unexposed frame portions by shifting one divided strip portion with respect to the other a distance equal to one half of a film frame.

5. An improved method for facilitating the production of stereoscopic film prints as in claim 4, wherein said processing and printing includes the further steps of joining the separate strip portions by overlapping respective, alternately-disposed right and left-eye view exposed and unexposed half frame portions, and printing as a single film strip incorporating only exposed portions of the twin images initially displayed at the film plane focus position.

References Cited
UNITED STATES PATENTS

| | | | |
|---|---|---|---|
| 609,993 | 7/1898 | Jenkins | 352—43 |
| 1,032,172 | 7/1912 | Zollinger. | |
| 1,494,795 | 5/1924 | Muller. | |
| 2,114,060 | 4/1938 | Oakley. | |

JULIA E. COINER, Primary Examiner

U.S. Cl. X.R.

352—43, 240